Dec. 19, 1961  A. J. DANIELS, JR  3,013,676
WINCH AND FRAME FOR HANDLING CABLE REELS
Filed Nov. 10, 1958  3 Sheets-Sheet 1
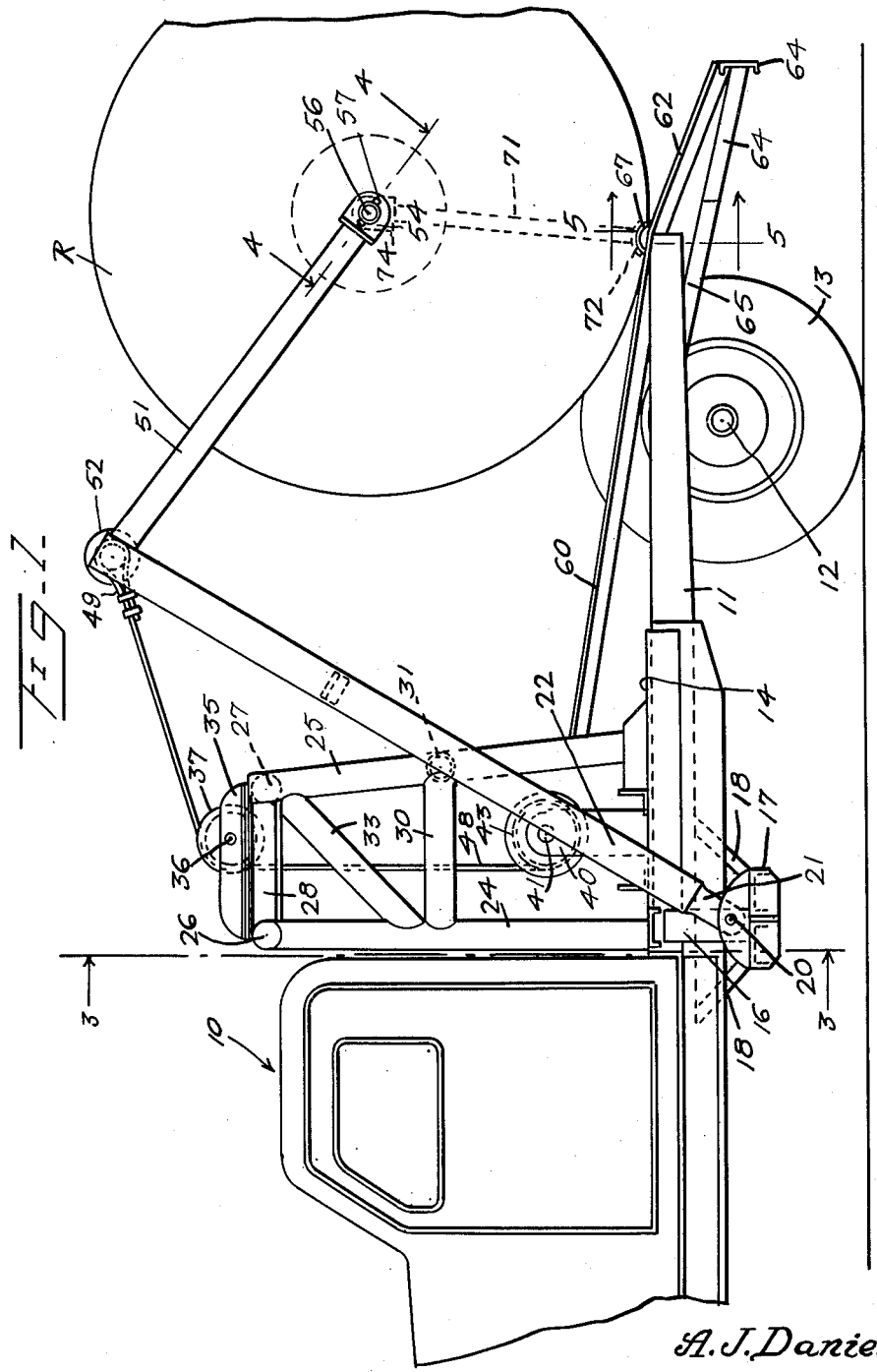
A. J. Daniels, Jr.
INVENTOR
BY *C. A. Snow & Co.*
ATTORNEYS.

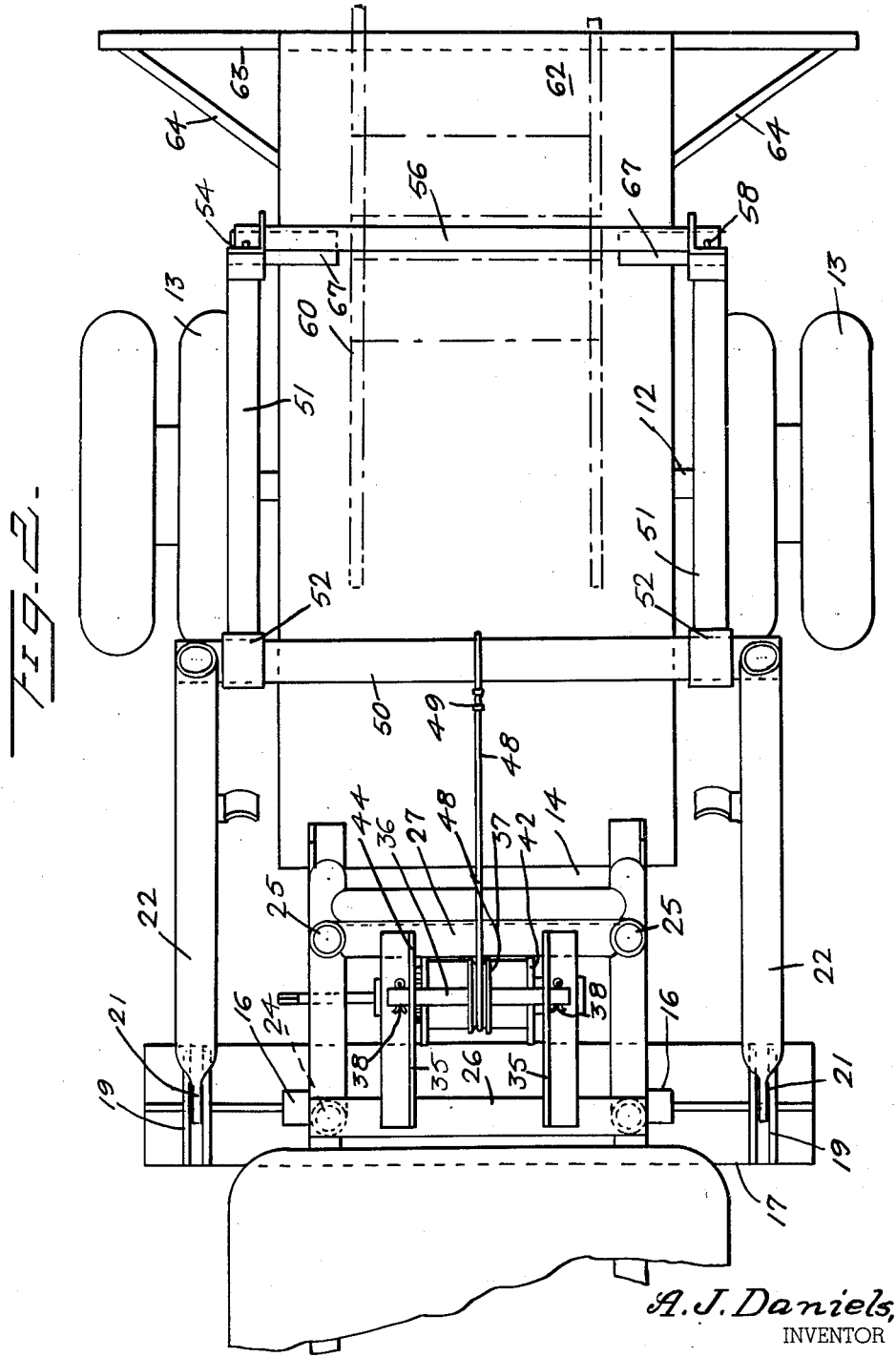

Dec. 19, 1961     A. J. DANIELS, JR     3,013,676
WINCH AND FRAME FOR HANDLING CABLE REELS
Filed Nov. 10, 1958     3 Sheets-Sheet 3
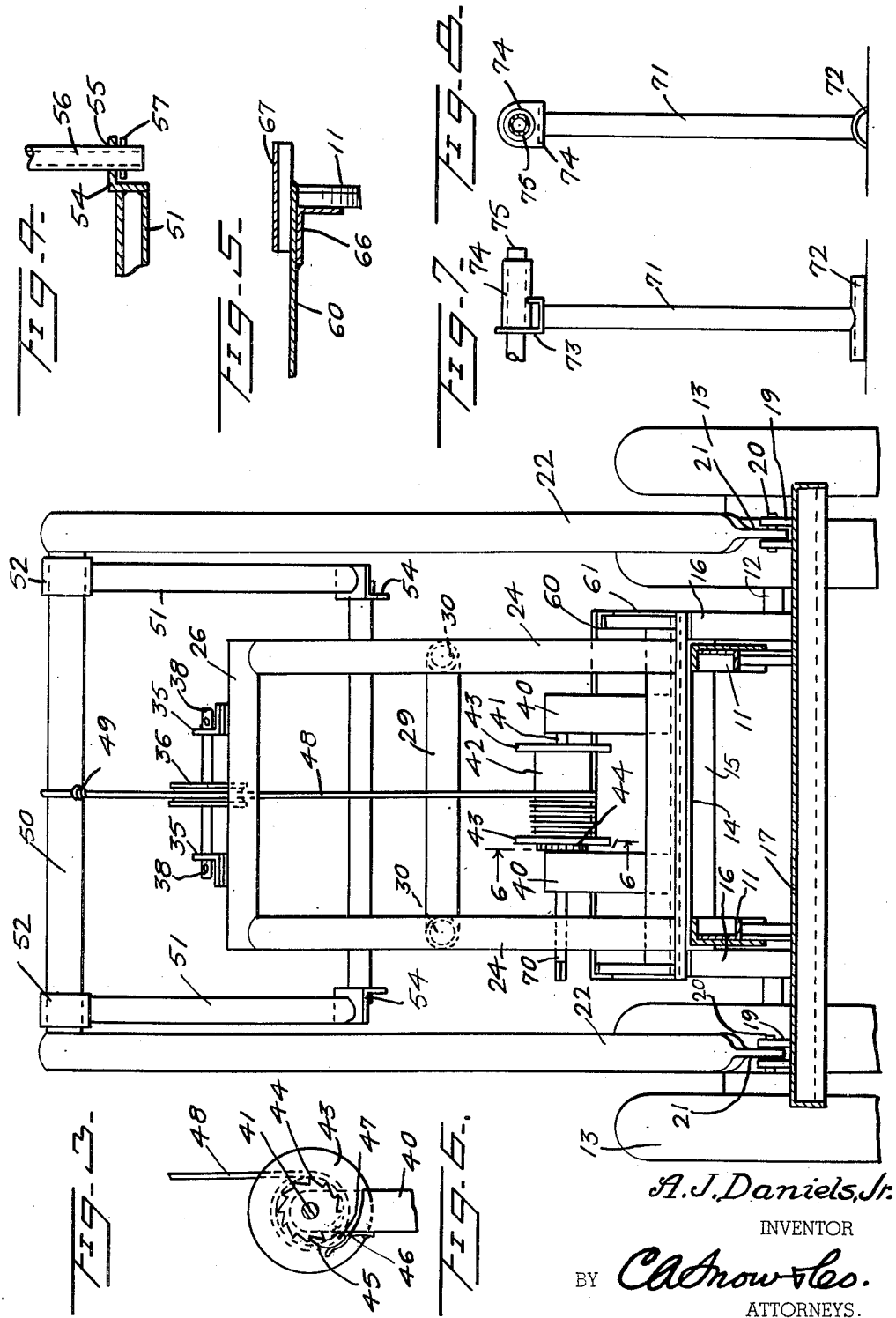
A. J. Daniels, Jr.
INVENTOR
BY C. A. Snow & Co.
ATTORNEYS.

United States Patent Office 3,013,676
Patented Dec. 19, 1961

3,013,676
WINCH AND FRAME FOR HANDLING
CABLE REELS
Albert J. Daniels, Jr., Box 227, West Palm Beach, Fla.
Filed Nov. 10, 1958, Ser. No. 773,094
3 Claims. (Cl. 214—77)

This invention relates to a winch and frame for the loading and unloading of cable reels or the like from transporting vehicles, and has as its primary object the provision of a simplified winch and frame adapted to be permanently mounted on a transporting vehicle, such as a motor truck, whereby a cable reel may be loaded and unloaded for transportation and use with a minimum of effort and difficulty.

Another object of the invention resides in the provision of means associated with such a winch and frame whereby cable may be wound or unwound from the reel while the reel is on the truck.

A further object of the invention is the provision of an apparatus of this character which will readily handle heavy cable reels with a minimum of effort and difficulty, and without the necessity of manual handling for either loading or unloading of reels, or for winding or unwinding the cable from the reel.

An additional object of the invention is the provision of such an apparatus which is sturdy and durable in construction, reliable and efficient in operation, and relatively simple and inexpensive to manufacture, assemble and utilize, and which may be readily applied to a wide variety of existing vehicles for transporting cable reels.

Still other objects reside in the combinations of elements, arrangements of parts, and features of construction, all as will be more fully pointed out hereinafter and shown in the accompanying drawings wherein there is disclosed a preferred embodiment of this inventive concept.

In the drawings:

FIGURE 1 is a side elevational view, partially broken away, of a motor truck carrying the frame and winch of the instant assembly, a cable reel being shown in related assembly therewith.

FIG. 2 is a top plan view of the apparatus of FIG. 1, the cable reel being removed.

FIG. 3 is a sectional view taken substantially along the line 3—3 of FIG. 1 as viewed in the direction indicated by the arrows, the cable reel being omitted.

FIG. 4 is an enlarged detail sectional view taken substantially along the line 4—4 of FIG. 1 as viewed in the direction indicated by the arrows.

FIG. 5 is an enlarged sectional view taken substantially along the line 5—5 of FIG. 1 as viewed in the direction indicated by the arrows.

FIG. 6 is a sectional view taken substantially along the line 6—6 of FIG. 3 as viewed in the direction indicated by the arrows.

FIG. 7 is an end elevational view of an auxiliary leg adapted to be associated with the mechanism when winding and unwinding cable from the reel, and FIG. 8 is a side elevational view of the leg of FIG. 7.

Similar reference characters refer to similar parts throughout the several views of the drawings.

Having reference now to the drawings in detail, there is generally indicated at 10 a truck body, including a frame having horizontal frame members 11, and the conventional rear axle 12 and rear wheels 13.

The frame members 11 support a bed plate 14, supported by a transversely extending channel iron 15, which has secured to the ends thereof depending plate or block members 16, which have secured to their under sides a pair of transversely extending secured together channel members 17, which are further secured by angularly disposed bracing members 18 secured to the under side of the frame members 11. Channel members 17 carry at their ends longitudinally positioned mounting brackets 19, which pivotally mount, as by means of pivot pins 20 the flattened ends 21 of lift booms 22. The plate 14 has mounted thereon an A frame, which comprises front uprights 24 and angularly inclined rear uprights 25, connected at their upper ends by transverse cross members 26 and 27 respectively, the front and rear uprights on each side being connected by longitudinally extending connectors 28. Intermediate frame members 29, 30 and 31 form a connection between the front uprights 24, the front and rear uprights on each side, and the rear uprights 25 respectively.

Angularly inclined reinforcing braces 32 are also provided.

Spaced apart L-shaped brackets 35 extend longitudinally from frame members 26 to 27, and have an axle 36 journaled transversely therebetween, a pulley 37 being carried by the axle, and suitable cotter pins 38 precluding displacement of the axle 36 relative to the supporting flanges 35.

A pair of spaced apart uprights 40 are mounted on the plate 14, and rotatably support an axle 41, which carries a winch drum 42. The drum 42 is provided with end plates 43, adjacent one of which is positioned a ratchet member 44, adapted to be engaged by a spring biased pawl 45, the spring being indicated at 46, and the pawl being pivotally mounted on a pivot 47 carried by the adjacent upright 40.

A rope or cable 48 is wound about the winch 42, and extends upwardly over the pulley 37, and is suitably secured, as by clamping means 49 about a transverse member 50, which extends between the free ends of the lift arms 22.

A pair of spaced auxiliary lift arms 51, are each provided with a looped extremity 52, which is rotatably mounted at one end of the transverse support 50 for pivotal movement relative thereto.

The end of each arm 51 has secured thereto an L-shaped flange 54, the projecting flat portion of each flange having a suitable hole 55 extending therethrough. An axle 56 is loosely mounted in the holes 55, and secured in position as by means of cotter pins 57, the axle 56 thus being removable upon the removal of a cotter pin at either end thereof.

An inclined ramp 60 extends upwardly from the rear end of the frame members 11 to an intermediate point adjacent the lower ends of the uprights 25, and is suitably supported on frame members 61.

A second ramp 62 extends downwardly at an incline from the rear ends of the frame members 11 and terminates in a transverse channel bar 63, reinforcing members 64 and 65 extending from the frame members 11 to the transverse channel bar 63.

Additional reinforcing members 66 are provided at the junction of the frame members 11 and the ramp portion 60, and arcuate semi-circular guide members 67 are positioned on either side of the juncture of the ramps 60 and 62 at the ends of the frame members 11.

From the foregoing the use and operation of the device should now be readily understandable.

When it is desired to raise a reel R of cable from the ground, for example, for transportation on the truck, the winch 42 is released by disengagement of the pawl 45 from the ratchet 44, and the lift arms 22 allowed to swing rearwardly of the vehicle about their respective pivots 20.

The auxiliary arms 51 are then extended on opposite sides of the reel, the axle 56 having been removed. The axle 56 is then reinserted through the hub of the reel and the cotter pins 57 repositioned.

The winch is then wound, in any desired manner, as for example by means of a crank (not shown) positioned on the polygonally shaped end 70 of the axle 41, and rotated. The force of the rope 48 then raises the transverse member 50 upwardly, pivoting the arms 22 about their pivots 20, and simultaneously pivoting the auxiliary arms 51 about their associated pivots formed on the transverse member 50. The force exerted on the axle 56 rolls the reel R upwardly until it seats snugly on the ramp 60 against the rear bar 25 of the A-shaped frame.

When it is desired to permit the reel to be lowered to the ground, obviously the ratchet and pawl arrangement may be released successively a notch at a time to gradually lower the reel, the axle 56 and the rope 48 obviously limiting the travel of the reel.

Under certain conditions it is desired to retain the reel on the truck body for unreeling a cable or the like.

In such instances legs 71 are employed, as shown in FIGS. 7 and 8, and in dotted lines in FIG. 1.

Each of the legs 71 is provided with an arcuate base 72 which is adapted to fit over the arcuate member 67, and each is further provided with an L-shaped top portion 73, which mounts a tubular member 74 extending transversely. The members 74 have a rod or sleeve 75 inserted therethrough, and pass through the hollow interior of the axle 56. The lengths of the shanks of the members 71 are of a length sufficient normally to space the axle 56, and hence the hub of the reel upwardly a distance above the arcuate member 67 slightly in excess of the radius of the wheel, so that the same may be rotated freely on the axle 56, for the purpose of reeling or unreeling cable therefrom.

Now from the foregoing it will be seen that there is herein provided a device which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

What is claimed is:

1. A winch for use on motor trucks having longitudinally extending frame members united at their outer ends by a transverse frame member, comprising a top supporting plate adapted to be positioned over said longitudinal frame members, downwardly depending side plates on said top supporting plate positioned on the outer sides of said longitudinal frame members, parallel lift booms pivoted at one end respectively to said downwardly depending side plates and swingable in vertical planes, a winch frame mounted on said top supporting plate, a winch drum rotatably mounted on said winch frame transversely of the longitudinally extending frame members, a cable trained over said winch and connected to the opposite ends of said parallel lift booms, auxiliary lift arms pivotally mounted at one end on the respective opposite ends of said lift booms, an axle through the opposite ends of said auxiliary lift arms for supporting a cable reel, and legs pivotally mounted on the latter ends of said auxiliary lift arms and adapted to rest on the transverse frame member of the truck for holding a cable reel free of the latter.

2. In a cable reel hoisting apparatus for use on motor trucks having longitudinally extending frame members united at their outer ends by a transverse frame member, a ramp comprised by two sections united in an apex adapted to be positioned on the transverse frame member with one section inclined rearwardly and downwardly from the transverse frame member and the other section inclined forwardly and upwardly with respect to the transverse frame member, a winch comprised by a top supporting plate adapted to be positioned over said longitudinal frame members, downwardly depending side plates on said top supporting plate positioned on the outer sides of said longitudinal frame members, parallel lift booms pivoted at one end respectively to said downwardly side plates and swingable in vertical planes with respect to said ramp sections, means for swinging said lift booms, auxiliary lift arms pivotally mounted at one end on the respective opposite ends of said lift booms, an axle through the opposite ends of said auxiliary lift arms for supporting a cable reel, and legs pivotally mounted on the latter ends of said auxiliary lift arms and adapted to rest on the apex of said ramp sections for holding a cable reel free of the latter.

3. In a cable reel hoisting apparatus for use on motor trucks having longitudinally extending frame members united in their outer ends by a transverse frame member, a ramp comprised by two sections united in an apex adapted to be positioned on the transverse frame member with one section inclined rearwardly and downwardly from the transverse frame member and the other section inclined forwardly and upwardly with respect to the transverse frame member, a winch comprised by a top supporting plate adapted to be positioned over said longitudinal frame members, downwardly depending side plates on said top supporting plate positioned on the outer sides of said longitudinal frame members, parallel lift booms pivoted at one end respectively to said downwardly depending side plates and swingable in vertical planes, a winch frame mounted on said top supporting plate, a winch drum rotatably mounted on said winch frame transversely of the longitudinally extending frame members, a cable trained over said winch drum and connected to the opposite ends of said parallel lift booms, auxiliary lift arms pivotally mounted at one end on the respective opposite ends of said lift booms, an axle through the opposite ends of said auxiliary lift arms for supporting a cable reel, and legs pivotally mounted on the latter ends of said auxiliary lift arms and adapted to rest on the apex of said ramp sections for holding a cable reel free of the latter.

References Cited in the file of this patent

UNITED STATES PATENTS

| | | |
|---|---|---|
| 1,823,380 | Schroeder | Sept. 15, 1931 |
| 1,864,676 | Smith et al. | June 28, 1932 |
| 2,550,185 | Busch | Apr. 24, 1951 |
| 2,616,636 | Aden | Nov. 4, 1952 |
| 2,747,754 | Maynard | May 29, 1956 |
| 2,848,123 | Keys | Aug. 19, 1958 |